US008557329B2

(12) United States Patent
Dai et al.

(10) Patent No.: US 8,557,329 B2
(45) Date of Patent: Oct. 15, 2013

(54) METHOD FOR SILICA ENCAPSULATION OF MAGNETIC PARTICLES

(75) Inventors: Qiu Dai, Sunnyvale, CA (US); Alshakim Nelson, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 12/775,439

(22) Filed: May 6, 2010

(65) Prior Publication Data

US 2011/0274832 A1 Nov. 10, 2011

(51) Int. Cl.
*B82Y 25/00* (2011.01)

(52) U.S. Cl.
USPC .......................................... 427/127; 427/131

(58) Field of Classification Search
USPC ........................................................ 427/127
See application file for complete search history.

(56) References Cited

U.S. PATENT DOCUMENTS

| | | | | |
|---|---|---|---|---|
| 5,077,169 | A | 12/1991 | Inoue et al. | |
| 6,103,379 | A | 8/2000 | Margel et al. | |
| 7,101,394 | B2 | 9/2006 | Hamm et al. | |
| 7,297,405 | B2 | 11/2007 | Kohno | |
| 7,332,351 | B2 | 2/2008 | Tan et al. | |
| 7,381,467 | B2 | 6/2008 | Arai et al. | |
| 7,405,002 | B2 | 7/2008 | Ying et al. | |
| 2005/0147963 | A1 | 7/2005 | Su et al. | |
| 2006/0148104 | A1 | 7/2006 | Marini et al. | |
| 2007/0059705 | A1 | 3/2007 | Lu et al. | |
| 2007/0269380 | A1 * | 11/2007 | Zhang et al. | 424/9.32 |
| 2008/0213377 | A1 | 9/2008 | Bhatia et al. | |
| 2009/0258076 | A1 | 10/2009 | Cheon et al. | |
| 2009/0280327 | A1 | 11/2009 | Ying et al. | |

FOREIGN PATENT DOCUMENTS

WO WO2007/097605 A1 * 8/2007 .................... 436/524

OTHER PUBLICATIONS

Hiramatsu et al., Langmuir, 2003, 19, 7003-7011.*
Wang et al., "Encapsulation of silica nanoparticles by redox-initiated graft polymerization from the surface of silica nanoparticles," 2008, Journal of Colloid and Interface Science, 326, 151-157.*
Wang et al., "Synthesis and Characterization of SiO2/(PMMA/Fe3O4) Magnetic Nanocomposites," 2008, Journal of Nanoscience and Nanotechnology, vol. 8, 1797-1802.*
Tago et al., "Novel Synthesis of Silica-Coated Ferrite Nanoparticles Using Water-in-Oil Emulsion," 2002, J. Am. Ceram. Soc. 85, 2188-94.*
Zhang et al., J. Phys. Chem. C. 2008, 112, 15151-15156.*
Bonini et al., "Synthesis and Characterization of Magnetic Nanoparticles Coated with a Uniform Silica Shell," Materials Science and Engineering C26:745-750 (2006).
De Palma et al., "Silane Ligand Exchange to Make Hydrophobic Superparamagnetic Nanoparticles Water-Dispersible," Chem. Mater. 19:1821-1831 (2007).

(Continued)

*Primary Examiner* — Michael Cleveland
*Assistant Examiner* — Sarah R Anderson
(74) *Attorney, Agent, or Firm* — Karen Canaan; CanaanLaw, P.C.

(57) ABSTRACT

Provided is a method of inhibiting magnetically induced aggregation of ferrimagnetic and/or ferromagnetic nanoparticles by encapsulating the nanoparticles in a silica shell. The method entails coating magnetic nanoparticle surfaces with a polyacid polymer to form polymer-coated magnetic nanoparticles and treating the polymer-coated magnetic nanoparticles with a silica precursor to form uniform silica-coated magnetic nanoparticles. By controlling the thickness of the silica encapsulating the nanoparticles, the inherent magnetically induced aggregation of the nanoparticles can be completely inhibited.

25 Claims, 8 Drawing Sheets

(56) References Cited

OTHER PUBLICATIONS

Jeong et al, "Superparamagnetic Colloids: Controlled Synthesis and Niche Applications," Adv. Mater. 19:33-60 (2007).
Kahn et al., "Synthesis and Magnetic Properties of CoFe2O4 Spinel Ferrite Nanoparticles Doped with Lanthanide Ions," Appl. Phys. Lett., 78(23):3651-3653 (Jun. 2001).
Laurent et al., "Magnetic Iron Oxide Nanoparticles: Synthesis, Stabilization, Vectorization, Physicochemical Characterizations, and Biological Applications Chemical Reviews," Chem. Rev. 108(6):2064-2110 (2008).
Lee et al., "Colloidal Magnetic Nanocrystals: Synthesis, Properties and Applications," Annu. Rep. Prog. Chem. (Sect. C) 103:351-402 (2007).
Lee et al, "Simple Synthesis of Functionalized Superparamagnetic Magnetite/Silica Core/Shell Nanoparticles and their Application as Magnetically Separable High-Performance Biocatalysts," SMALL 4(1):143-152 (2008).
Li et al, "Multifunctional Ruthenium (II) Polypyridine Complex-Based Core—Shell Magnetic Silica Nanocomposites: Magnetism, Luminescence, and Electrochemiluminescence," ACSNANO 2(5):905-912 (2008).
Lu et al, "Modifying the Surface Properties of Superparamagnetic Iron Oxide Nanoparticles through a Sol-Gel Approach," Nano Letters 2(3):183-186 (2002).
Lu et al., "Magnetic Nanoparticles: Synthesis, Protection, Functionalization, and Application," Angew. Chem. Int. Ed. 46:1222-1244 (2007).
Ning et al., "High Perpendicular Coercive Field of (100)-oriented CoFe2O4 Thin Films on Si (100) with MgO Buffer Layer," Journal of Applied Physics 103:013911-1-13911-4 (2008).
Pankhurst et al., "Applications of Magnetic Nanoparticles in Biomedicine," J. Phys. D: Appl. Phys. 36:R167-R181 (2003).
Rondinone et al, Superparamagnetic Relaxation and Magnetic Anisotropy Energy Distribution in CoFe2O4 Spinel Ferrite Nanocrystallites, J. Phys. Chem. B 103:6876-6880 (1999).
Shen et al, "Bilayer Surfactant Stabilized Magnetic Fluids: Synthesis and Interactions at Interfaces," LANGMUIR 15: 447-453 (1999).
Shin et al, "Thiol Containing Polymer Encapsulated Magnetic Nanoparticles as Reusable and Efficiently Separable Adsorbent for Heavy Metal Ions," Chem. Comm. pp. 4230-4232 (2007).
Song et al., "Shape Control and Associated Magnetic Properties of Spinel Cobalt Ferrite Nanocrystals," J. Am. Chem. Soc. 126:6164-6168 (2004).
Sun et al., "Monodisperse MFe2O4 (M = Fe, Co, Mn) Nanoparticles," J. Am. Chem. Soc. 126:273-279 (2004).
Vestal et al., "Synthesis and Magnetic Characterization of Mn and Co Spinel Ferrite-Silica Nanoparticles with Tunable Magnetic Core," Nano Letters 3(12):1739-1743 (2003).
Yi et al, "Silica-Coated Nanocomposites of Magnetic Nanoparticles and Quantum Dots," J. Am. Chem. Soc. 127:4990-4991 (2005).
Yi et al, "Nanoparticle Architectures Templated by SiO2/Fe2O3 Nanocomposites," Chem. Mater. (18):614-619 (2006).

* cited by examiner

METHOD FOR SILICA ENCAPSULATION OF MAGNETIC PARTICLES

TECHNICAL FIELD

The present invention relates generally to methods for silica encapsulation of magnetic particles. More specifically, the present invention relates to methods for creating a uniform silica coating of a controlled thickness around magnetic nanoparticles that inhibits magnetically induced aggregation of the nanoparticles.

BACKGROUND OF THE INVENTION

Surface coating of ferrimagnetic and/or ferromagnetic nanoparticles with desired functionality and controlled magnetic properties is critical to the development of magnetic nanomaterials for high density recording media as well as biomedical applications. A significant challenge to utilizing magnetic nanoparticles for materials applications is the inherent aggregation of nanoparticles that takes place as a result of magnetic interparticle attractions. Strong magnetic nanoparticle interactions result in poor nanoparticle dispersion in solvents. Well-dispersed samples of magnetic nanoparticles are desirable for processing the particles from solution to form, for example, magnetic tape media. Magnetostatic exchange coupling interactions are highly dependent upon interparticle distances, thus, the interactions can be minimized by introducing a non-magnetic shell around the nanoparticles.

Among the various ferrite materials used in magnetic recording media applications, ferrimagnetic cobalt ferrite ($CoFe_2O_4$) nanoparticles (>~16 nm) with inverse spinel structures are of particular interest. These nanoparticles, which can be synthesized via colloidal methods, possess excellent chemical stability and mechanical strength as well as magnetocrystalline anisotropy and moderate saturation magnetization.

The solution phase synthesis of $CoFe_2O_4$ nanoparticles with uniform size and morphology has progressed significantly during the last decade. One of the most commonly used solution phase methods for synthesizing $CoFe_2O_4$ is the thermal decomposition of $Fe(acac)_3$ and $Co(acac)_2$ precursors in the presence of oleic acid surfactants in a high boiling point solvent, such as benzyl ether. With this method, oleic acid surfactants protect the resulting $CoFe_2O_4$ nanoparticles and afford the nanoparticles solubility in nonpolar solvents, such as hexane. The magnetic properties of $CoFe_2O_4$ nanoparticles synthesized in this way may be changed from superparamagnetic to ferrimagnetic at room temperature by altering the size and shapes of the nanoparticles. The successful synthesis of $CoFe_2O_4$ nanoparticles using the oleic acid surfactant method is therefore two-fold, depending on: (i) the ability to modify the surface of the nanoparticles by controlling shell thickness, colloidal stability, and surface functionality; and (ii) the ability to control the composition, shape, size, and magnetic properties of the nanoparticles.

The successful synthesis of magnetic nanoparticles by the oleic acid surfactant method, however, does not ensure the successful industrial application of the nanoparticles. A disadvantage of oleic acid surfactant magnetic nanoparticle synthesis is the instability of the resulting magnetic nanoparticles; specifically, as a result of strong magnetic forces, magnetic nanoparticles in solution have the tendency to irreversibly aggregate and ultimately precipitate from the solution. This aggregation of the magnetic nanoparticles renders the nanoparticles unsuitable for silica encapsulation.

The formation of silica core-shell nanoparticles is known to those experienced in the art. The most widely used silica coating method is the tetraethylorthosilicate (TEOS) method. With this method, the silica precursor TEOS is added to a mixture of nanoparticles in an ethanol/ammonia solution in order to grow the silica shell on the nanoparticle surface. While this method is suitable for nanoparticles, such as metal nanoparticles, quantum dots, and superparamagnetic particles, this method is not suitable for creating uniform silica shells around magnetic nanoparticles. Metal nanoparticles, quantum dots, and superparamagnetic particles are suitable for the TEOS method because they do not have the same interparticle magnetic forces that are present with magnetic nanoparticles. In this vein, magnetic nanoparticles are unsuitable for the TEOS method because the strong interparticle magnetic attractions of the magnetic nanoparticles cause irreversible aggregation of the nanoparticles, thus preventing the formation of a uniform silica shell around the individual nanoparticles.

As noted above, the inherent aggregation of magnetic nanoparticles and the formation of non-uniform silica shells around individual and/or clusters of the nanoparticles hinder the production of monodisperse magnetic nanoparticle samples for magnetic applications. Successful silicon encapsulation of magnetic nanoparticles thus requires a way to inhibit aggregate formation prior to growth of the silica shell.

SUMMARY OF THE INVENTION

The present invention overcomes the shortcomings in the art by providing, in one embodiment of the invention, a method comprising: (a) treating magnetic nanoparticles with a polyacid polymer to form a polymer-coated magnetic nanoparticles; and (b) reacting the polymer-coated magnetic nanoparticles with a silica precursor to form silica-coated magnetic nanoparticles. The silica encapsulation of the polymer-coated magnetic nanoparticles serves to completely inhibit any magnetically-induced aggregation inherent in the pre-coated and/or the polymer-coated magnetic nanoparticles.

In another embodiment of the invention, the method further comprises: (c) reacting the silica-coated magnetic nanoparticles with a reactive silane to enable surface modification of the silica-coated magnetic nanoparticles with other organic functional groups.

The magnetic nanoparticles of the present invention may be selected from the group consisting of ferrimagnetic nanoparticles and ferromagnetic nanoparticles. The magnetic nanoparticles of the present invention may comprise an element selected from the group consisting of Co, Fe, Ni, Mn, Sm, Nd, Pt, and Gd. In a preferred embodiment, the ferrimagnetic nanoparticles comprise cobalt ferrite ($CoFe_2O_4$).

The polyacid polymer of the present invention may be selected from the group consisting of poly(acrylic acid) (PAA), poly(methacrylic acid), poly(vinylsulfonic acid), poly(vinylphosphonic acid), and copolymers thereof. In a preferred embodiment, the polyacid polymer is PAA.

The silica precursor of the present invention may be selected from the group consisting of tetraalkylorthosilicates ($Si(OR_1)_4$) and trialkoxyalkylsilanes ($R_2Si(OR_3)_3$), wherein each of R1, R2, and R3 is hydrogen, a monovalent hydrocarbon radical comprising 1 to 30 carbons, or an aminoalkyl group comprising 1 to 5 carbons. In one embodiment, the silica precursor is selected from the group consisting of tetraethylorthosilicate (TEOS), tetramethylorthosilicate (TMOS), tetrapropylorthosilicate, methyltrimethoxysilane, and methyltriethoxysilane. In a preferred embodiment, the silica precursor is TEOS.

In one embodiment, the silica-coated magnetic nanoparticles may be amine functionalized with reactive silane aminopropyltrimethoxysilane (APTMS).

In another embodiment, the amine-functionalized silica-coated magnetic nanoparticles are further reacted with activated carboxylic acids to form amide bonds.

In a further embodiment, the amine-functionalized silica-coated magnetic nanoparticles are further reacted with acrylates to form secondary and tertiary amines.

In another embodiment, the amine-functionalized silica-coated magnetic nanoparticles are further reacted with poly(ethylene glycol) acrylate to form poly(ethylene glycol) functionalized silica-coated magnetic nanoparticles.

In another embodiment of the present invention, there is provided a method comprising: (a) treating ferrimagnetic and/or ferromagnetic nanoparticles with poly(acrylic acid) (PAA) to form PAA-modified magnetic nanoparticles; and (b) reacting the PAA-modified magnetic nanoparticles with tetramethylorthosilicate (TEOS) to form silica-coated magnetic nanoparticles. The silica encapsulation of the PAA-modified magnetic nanoparticles serves to completely inhibit any magnetically-induced aggregation inherent in the ferrimagnetic and/or ferromagnetic nanoparticles and/or of the PAA-modified magnetic nanoparticles.

In another embodiment of the invention, the method further comprises: (c) reacting the silica-coated magnetic nanoparticles with a reactive silane to enable surface modification of the silica-coated magnetic nanoparticles with other organic functional groups.

In one embodiment, the silica-coated magnetic nanoparticles may be amine functionalized with the reactive silane aminopropyltrimethoxysilane (APTMS).

In another embodiment, the amine-functionalized silica-coated magnetic nanoparticles may be further reacted with activated carboxylic acids to form amide bonds.

In a further embodiment, the amine-functionalized silica-coated magnetic nanoparticles may be further reacted with acrylates to form secondary and tertiary amines.

In another embodiment, the amine functionalized silica-coated magnetic nanoparticles are further reacted with poly(ethylene glycol) acrylate to form poly(ethylene glycol) functionalized silica-coated magnetic nanoparticles.

In one embodiment of the present invention, the magnetic nanoparticles of step (a) have a diameter of 1 to 100 nm.

In another embodiment of the present invention, the silica-coated magnetic nanoparticles of step (b) have a silica shell thickness of 1 to 100 nm.

In a further embodiment of the present invention, the magnetic nanoparticles of step (a) and the silica-coated magnetic particles of step (b) have the same core diameter. Additional aspects and embodiments of the invention will be provided, without limitation, in the detailed description of the invention that is set forth below.

BRIEF DESCRIPTION OF THE FIGURES

FIG. 3A shows unmodified $CoFe_2O_4$ nanoparticles; FIG. 3B shows PAA-modified $CoFe_2O_4$ nanoparticles; FIG. 3C shows silica-coated $CoFe_2O_4$ nanoparticles with 10 nm shell thickness; and FIG. 3D shows silica-coated $CoFe_2O_4$ nanoparticles with 20 nm shell thickness.

DETAILED DESCRIPTION OF THE INVENTION

Set forth below is a description of what are currently believed to be preferred embodiments of the claimed invention. Any alternates or modifications in function, purpose, or structure are intended to be covered by the claims of this application. As used in this specification and the appended claims, the singular forms “a,” “an,” and “the” include plural referents unless the context clearly dictates otherwise. The terms “comprises” and/or “comprising,” as used in this specification and the appended claims, specify the presence of stated features, integers, steps, operations, elements, and/or components, but do not preclude the presence or addition of one or more other features, integers, steps, operations, elements, components, and/or groups thereof.

Preferred methods described herein are suitable for magnetic nanoparticles that have ferrimagnetic and/or ferromagnetic behavior at temperatures above −73° C. (200 K), preferably at temperatures above 0° C. (273 K). The magnetic nanoparticles have a substantially uniform diameter not exceeding 100 nm. In one embodiment of the invention, the magnetic nanoparticles are treated with a polymer comprising at least 3 acid groups that bind to the surface of the magnetic nanoparticles. Examples of suitable polyacid polymers for use with the present invention include, but are not limited to, PAA, poly(methacrylic acid), poly(vinylsulfonic acid), poly(vinylphosphonic acid), and copolymers thereof. In a preferred embodiment, PAA is used to coat the surface of the magnetic nanoparticles.

In another embodiment of the invention, the magnetic nanoparticles comprise a magnetic material comprising an element selected from the group consisting of Co, Fe, Ni, Mn, Sm, Nd, Pt, and Gd. In a further embodiment, the magnetic nanoparticles comprise intermetallic nanoparticles comprising the aforesaid elements, binary alloys comprising the aforesaid elements, and ternary alloys comprising the aforesaid elements. In another embodiment, the magnetic nanoparticles comprise an oxide of Fe comprising at least one of the aforesaid elements other than Fe (e.g., Co, Ni, Mn, Sm, Nd, Pt, and Gd). In a preferred embodiment, the magnetic nanoparticles are comprised of cobalt ferrite ($CoFe_2O_4$). In another embodiment, the magnetic nanoparticles are comprised of barium ferrite (BaFe) or strontium ferrite ($SrO·6Fe_2O_3$ or $SrFe_{12}O_{19}$). In a further embodiment, the magnetic nanoparticles comprise an oxide surface comprising an element selected from the group consisting of Co, Fe, Ni, Mn, Sm, Nd, Pt, Gd, Yt, and Al.

The following method will be described with reference to the figures with $CoFe_2O_4$ nanoparticles as an exemplary magnetic nanoparticles and PAA as an exemplary polyacid polymer; however, it is to be understood that the method described herein is not limited to $CoFe_2O_4$ nanoparticles or PAA. The present invention may be practiced with any suitable magnetic nanoparticle or polyacid polymers, respectively.

Figure 1:
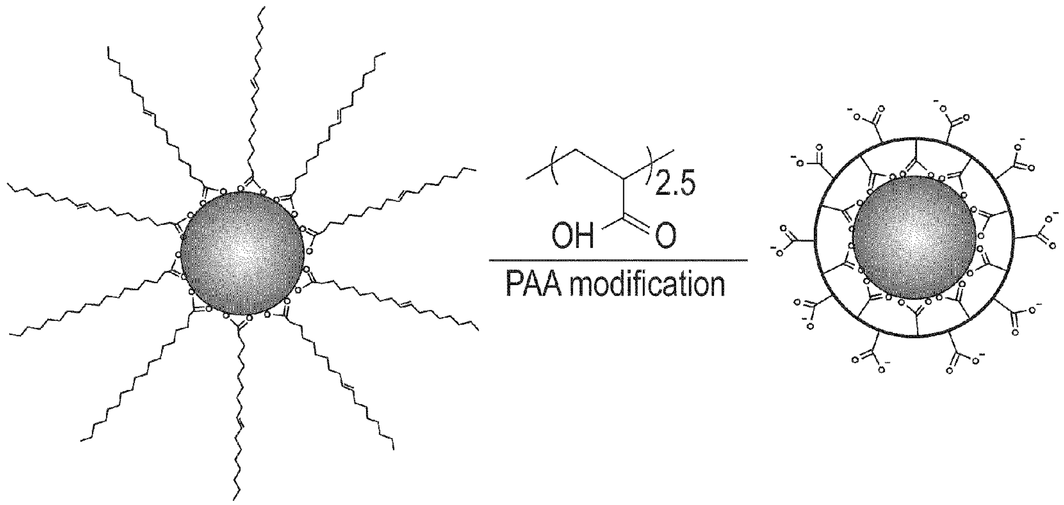
FIG. 1 is a schematic illustration of poly(acrylic acid) (PAA) modification of $CoFe_2O_4$ nanoparticles.
Figure 2:
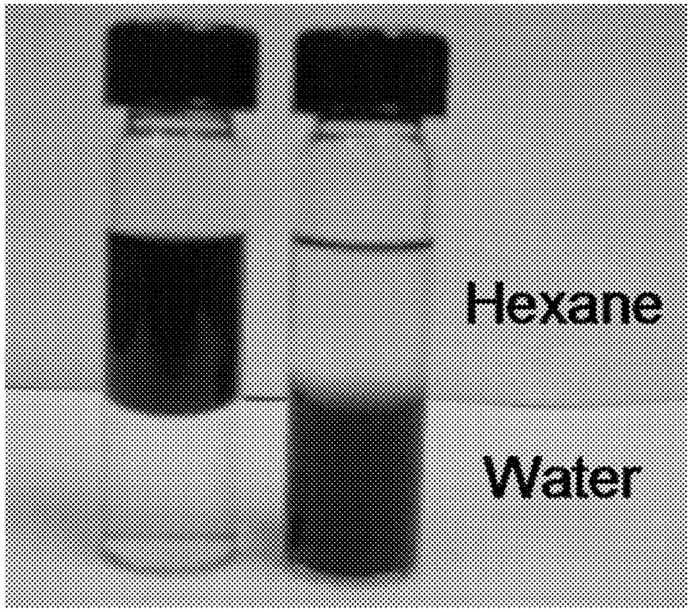
FIG. 2 shows the precipitate of 18 nm $CoFe_2O_4$ nanoparticles before (left) and after (right) PAA modification.

With reference to FIG. 1, the PAA polymer binds strongly to the oxide surface of the $CoFe_2O_4$ nanoparticle as a result of multivalent interactions. The PAA-modified nanoparticles are readily dispersed in water, ethanol, hexane, and other polar solvents. FIG. 2 shows $CoFe_2O_4$ nanoparticles dispersed in hexane (dark liquid) before (left) and after (right) PAA modification. As shown in FIG. 2, the PAA modification changes the solubility of the $CoFe_2O_4$ nanoparticles from hydrophobic (soluble in hexane) to hydrophilic (soluble in water). At pH 7, the aqueous solution of the PAA-modified $CoFe_2O_4$ nanoparticles remains stable. In this respect, samples of the PAA-modified $CoFe_2O_4$ nanoparticles described herein showed no change after storage in excess of 3 months under ambient conditions.

Following the formation of PAA-modified $CoFe_2O_4$ nanoparticles, a uniform silica shell is grown on the nanoparticle surface. PAA-modified nanoparticles are suitable for nucleating the growth of a silica shell around the nanoparticle upon the addition of a silica precursor. Silica precursors that may be used for preparing the silica shell may be selected from the group consisting of tetraalkylorthosilicates ($Si(OR_1)_4$) and trialkoxyalkylsilanes ($R_2Si(OR_3)_3$), wherein each of R1, R2, and R3 is hydrogen, a monovalent hydrocarbon radical comprising 1 to 30 carbons, or an aminoalkyl group comprising 1 to 5 carbons. Examples of silica precursors include, without limitation, TEOS, tetramethylorthosilicate (TMOS), tetrapropylorthosilicate, methyltrimethoxysilane, and methyltriethoxysilane.

Figure 3A:
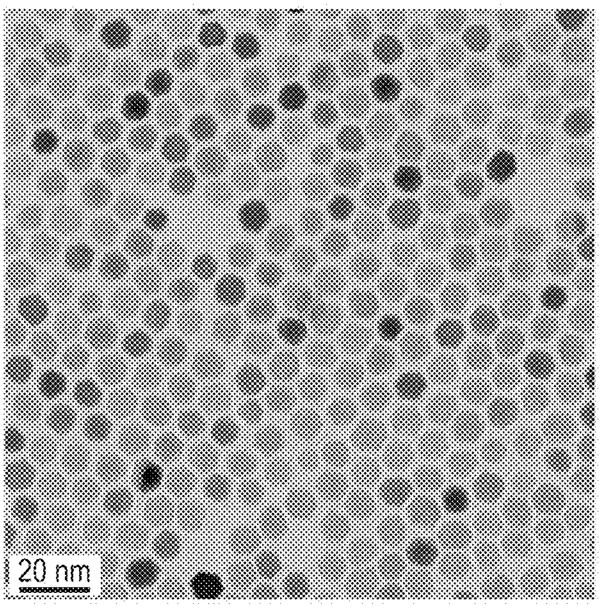
FIGS. 3A to 3D show TEM (transmission electron microscopy) images of 18 nm $CoFe_2O_4$ nanoparticles before and after surface modification.
Figure 3B:
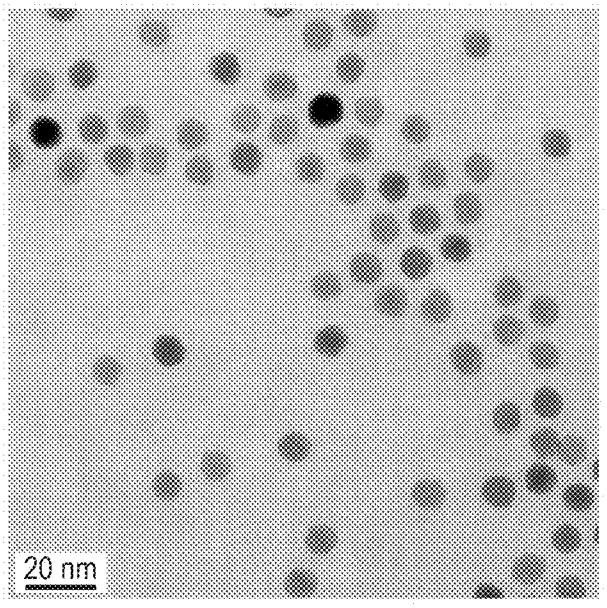
Figure 3C:
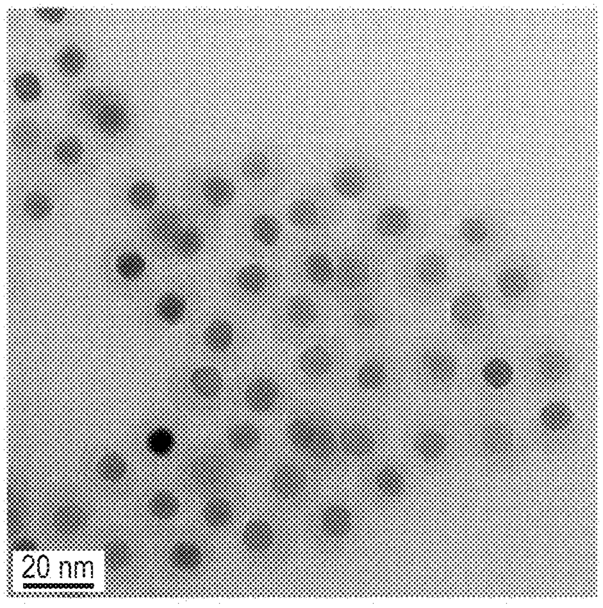
Figure 3D:
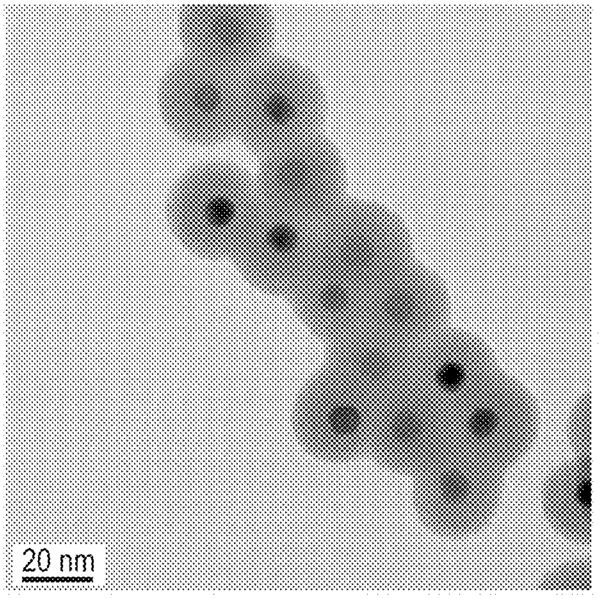

In one embodiment of the invention, well-defined silica shells are formed around the individual PAA-modified magnetic nanoparticles (also referred to herein as "seed particles") by adding TEOS dropwise with stirring to a solution of the nanoparticles in ethanol. The thickness of the silica shell is dependent upon the amount of TEOS added to the reaction mixture; thus, by carefully adding small volumes of the TEOS to the seed particles, it is possible to produce silica shells that have a thickness of 1 to 100 nm. FIG. 3 shows TEM images of 18 nm $CoFe_2O_4$ nanoparticles before and after surface modification with silica coating. FIG. 3A shows unmodified $CoFe_2O_4$ nanoparticles; FIG. 3B shows PAA-modified $CoFe_2O_4$ nanoparticles; FIG. 3C shows silica-coated $CoFe_2O_4$ nanoparticles with 10 nm shell thickness; and FIG. 3D shows silica-coated $CoFe_2O_4$ nanoparticles with 20 nm shell thickness. The thickness of the 10 nm silica layer of FIG. 3C was increased in FIG. 3D to 20 nm by the repeated addition of TEOS to the solution of 10 nm silica-coated $CoFe_2O_4$ nanoparticles. It is important to note that the 18 nm core diameter of the unmodified $CoFe_2O_4$ nanoparticles did not change after the surface modification. The identical 18 nm core diameter of the unmodified and the surface modified $CoFe_2O_4$ nanoparticles indicates that the structure of the magnetic nanoparticles of the present invention remain intact during the silica coating process.

In the TEOS method, the formation of empty silica particles (i.e., silica particles that do not contain any magnetic nanoparticles within them) is dependent upon the total surface area of the seed particles per volume and the concentration of the TEOS. In this respect, if the total surface area of the seed particles per volume is very large compared to the concentration of TEOS, the formation of empty silica particles may be completely suppressed.

Figure 4:
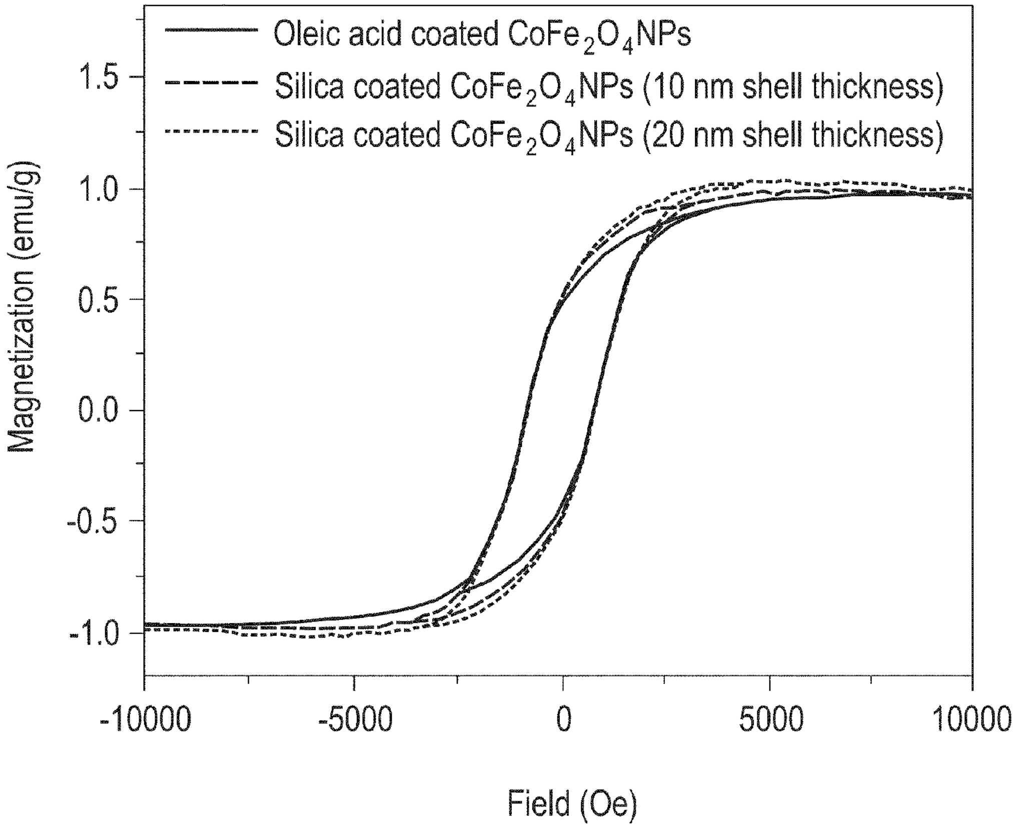
FIG. 4 shows room temperature hysteresis loops of $CoFe_2O_4$ nanoparticles before and after silica coating.

The magnetic properties of the magnetic nanoparticles of the present invention may be determined by measuring the in-plane magnetic hysteresis loops and remanence curves of a solution of the nanoparticles with a vibrating sample magnetometer (VSM). FIG. 4 shows room temperature hysteresis loops for 18 nm $CoFe_2O_4$ nanoparticles before and after silica coating (with 10 nm and 20 nm shell thicknesses). The curves in the graph of FIG. 4 demonstrate that both the unmodified and modified $CoFe_2O_4$ nanoparticles have sufficient magnetocrystalline anisotropy to be ferrimagnetic at room temperature. The coercivity of the unmodified nanoparticles is approximate 739 Oe, and the saturation magnetization of the unmodified nanoparticles is approximately 73.6 emu/g, which is in agreement with literature values. As shown in FIG. 4, when the nanoparticles were coated with 10 nm silica shells, the saturation magnetization of the nanoparticles decreased slightly to 59.5 emu/g while the coercivity value increased to 832 Oe. When the thickness of the silica shell coating was increased to 20 nm, the saturation magnetizaton further decreased to 12.6 emu/g, but the coercivity value remained at 832 Oe.

Figure 5:
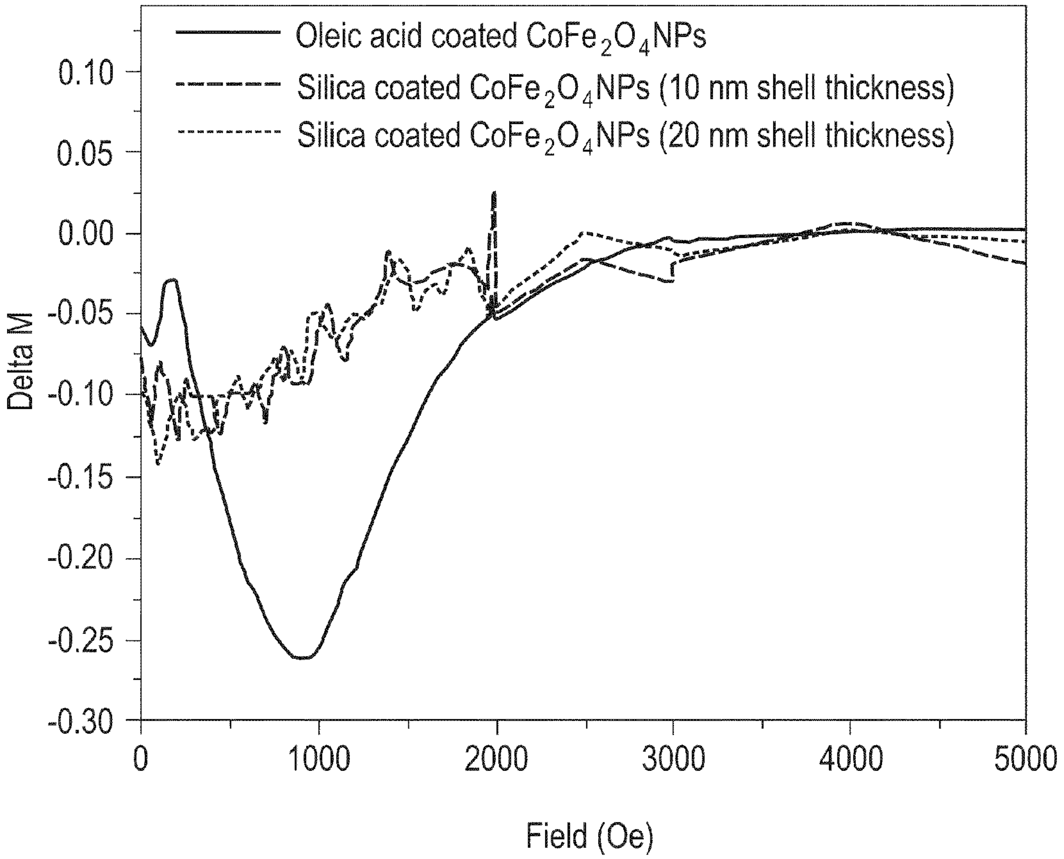
FIG. 5 shows delta-M curves of $CoFe_2O_4$ nanoparticles before and after silica coating.

The nature and strength of the magnetic coupling interactions between the individual magnetic nanoparticles of the present invention were determined using the delta-M technique: $\Delta M=Md-(1-2Mr)$, where Md is the direct current demagnetization (DCD) and Mr is the isothermal remanent magnetization (IRM). The IRM and DCD values were measured by applying a successively larger field to the initially AC demagnetized sample, and a successively larger reverse field to the previously saturated sample, respectively. FIG. 5 shows the delta-M curves of $CoFe_2O_4$ nanoparticles before and after silica coating (with 10 nm and 20 nm shell thicknesses). As shown in FIG. 5, the unmodified $CoFe_2O_4$ nanoparticles produce a negative peak with a value of −0.2, indicating strong magnetostatic coupling interactions between the nanoparticles. The delta-M value decreased after coating with 10 or 20 nm silica shells. The decrease in the delta-M value is a consequence of a decrease in the magnetostatic coupling interactions, which is dependent on the interparticle distances. The foregoing demonstrates that controlling the shell thickness of the silica coating on magnetic nanoparticles allows for the precise tailoring of the magnetostatic coupling interactions between the nanoparticles.

In another embodiment of the invention, the silica shell surface can be functionalized with a reactive silane in order to improve the dispersibility of the silica-coated magnetic nanoparticles in solvent. In one embodiment, the silica shell surface is reacted with APTMS to form amine functionalized silica-coated magnetic nanoparticles. The amine group can be further reacted with activated carboxylic acids to form amide bonds or with acrylates in a Michael reaction. In another embodiment, the amine functionalized silica-coated magnetic nanoparticles are reacted with poly(ethylene glycol) acrylate to form poly(ethylene glycol) functionalized silica-coated magnetic nanoparticles.

The method described herein allows for the production of stable dispersions of silica-coated magnetic nanoparticles with finely tuned magnetic coupling interactions. As described herein, the magnetic coupling interactions between individual or clustered magnetic nanoparticles are kept in check by controlling the thickness of the silica shell encapsulating the nanoparticles. In this way, the magnetic nanoparticles of the present invention display the functionality and controlled magnetic properties that are critical to the development of tunable magnetic nanomaterials for high density recording media and/or biomedical applications.

It is to be understood that while the invention has been described in conjunction with the embodiments set forth above, the foregoing description as well as the examples that follow are intended to illustrate and not limit the scope of the invention. Further, it is to be understood that the embodiments and examples set forth herein are not exhaustive and that modifications and variations of the invention will be apparent to those of ordinary skill in the art without departing from the scope and spirit of the invention. For instance, while the examples set forth below describe experiments conducted on oleic acid-coated hydrophobic nanoparticles, it is to be understood that the methods described herein are not limited to application to oleic acid-coated hydrophobic nanoparticles; rather, the method can potentially be used with any nanomaterials having an oxide surface.

All patents and publications mentioned herein are incorporated by reference in their entireties.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

The following characterization methods were used in the examples. FT-IR spectra of the $CoFe_2O_4$ nanoparticles were recorded on a Thermo Nicolet NEXUS 670 FT-IR. TGA was performed under a nitrogen atmosphere at a heating rate of 10° C./min using a Perkin-Elmer TGS-2 instrument. TEM images were recorded on a Philips CM12 TEM (120 KV). A drop of $CoFe_2O_4$ nanoparticle solution was placed onto a carbon-coated copper grid and left to dry at room temperature. Magnetic measurements were carried out using an ADE Technologies DMS Model 10 VSM.

EXAMPLE 1

Synthesis of Ferrimagnetic $CoFe_2O_4$ Nanoparticles

Ferrimagnetic $CoFe_2O_4$ nanoparticles were synthesized using a modified thermal decomposition method. 2 mmol $Fe(acac)_3$, 1 mmol $Co(acac)_2$, 10 mmol 1,2-hexadecanediol, 6 mmol oleic acid, 6 mmol oleylamine, and 20 mL of benzyl ether were combined and mechanically stirred under a flow of $N_2$. The mixture was heated to 200° C. for 2 h and then, under a blanket of $N_2$, heated to reflux (~300° C.) for 1 h. The resulting black colored mixture was cooled to ambient temperature. Next, 40 mL of ethanol was added to the mixture and the resulting black material was precipitated and separated via centrifugation at 6000 rpm for 10 min. The black precipitate was dissolved in hexane with 0.1% oleic acid, and the mixture was centrifuged at 6000 rpm for 10 min to remove any undispersed residue. The product was then precipitated with ethanol, centrifuged to remove the solvent, and dried in vacuum overnight. The average diameter of the $CoFe_2O_4$ nanoparticles was measured at 6 nm with narrow size distribution.

The 6 nm $CoFe_2O_4$ nanoparticles were used as seeds to grow larger particles according to the following protocol. 2 mmol $Fe(acac)_3$, 1 mmol $Co(acac)_2$, 10 mmol 1,2-hexadecanediol, 2 mmol oleic acid, 2 mmol oleylamine, and 20 mL of benzyl ether were mixed and mechanically stirred under a flow of $N_2$. Next, 6 mL of the above synthesized 6 nm $CoFe_2O_4$ solution in hexane (15 mg/mL) was added to the mixture. The mixture was first heated to 100° C. for 30 min to remove the hexane, and then increased to 200° C. for 1 h. Under a blanket of $N_2$, the mixture was further heated to 300° C. for 30 min. Following the same procedure set forth above, the black colored mixture was cooled to ambient temperature and 40 mL of ethanol was added to the mixture causing the black material to precipitate. The black precipitate was separated via centrifugation at 6000 rpm for 10 min and then dissolved in hexane with 0.1% oleic acid. The mixture was centrifuged at 6000 rpm for 10 min to remove any undispersed residue. The product was then precipitated with ethanol, centrifuged to remove the solvent, and dried in vacuum overnight. Following this procedure, monodispersed $CoFe_2O_4$ nanoparticles with a diameter of 15 nm were obtained.

The seed mediated growth method set forth above was repeated to prepare 18 nm monodispersed $CoFe_2O_4$ nanoparticles.

EXAMPLE 2

PAA Surface Modification of 18 nm $CoFe_2O_4$ Nanoparticles

In a glass container under ambient conditions, 1 mL of PAA in tetrahydrofuran (THF) solution (10 mg/mL) was added to a dispersion of the synthesized 18 nm $CoFe_2O_4$ nanoparticles (10 mg in 10 mL) from Example 1. The mixture was shaken for 2 hours with occasional sonication. The modified particles were separated with a magnet and the solvent was decanted. The particles were washed three times with hexane and methanol to remove any free oleic acid and excess PAA polymers. The washed particles were dispersed in aqueous solution by ionizing the carboxylic groups with a dilute NaOH solution.

Figure 6:
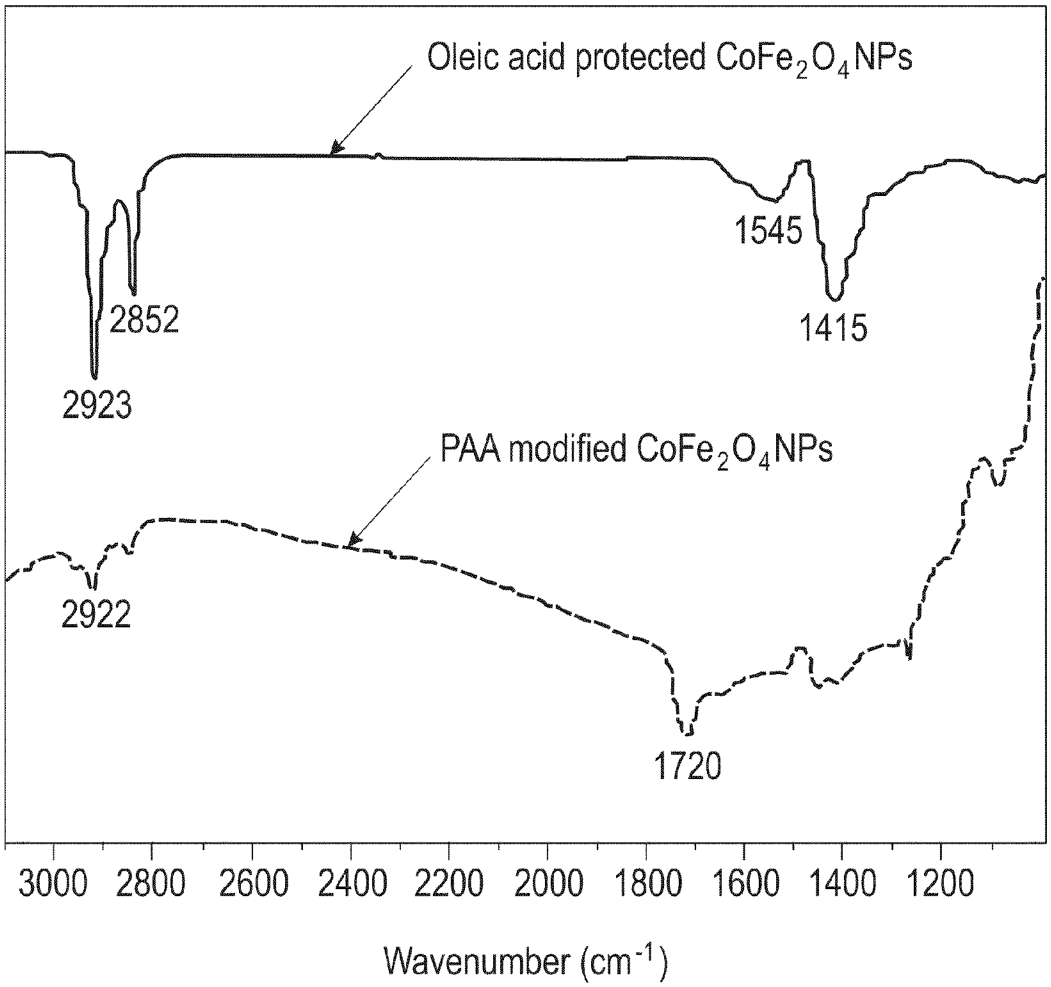
FIG. 6 shows FT-IR (Fourier Transform InfraRed) spectra of $CoFe_2O_4$ nanoparticles before and after PAA modification.

FT-IR spectroscopy was utilized to characterize the functional groups present on the particle surface after the PAA ligand exchange. FIG. 6 shows a comparative FT-IR graph of the unmodified and PAA-modified $CoFe_2O_4$ nanoparticles. As shown in FIG. 6, the unmodified $CoFe_2O_4$ nanoparticles showed strong $CH_2$ bands at 2923 $cm^{-1}$ and 2852 $cm^{-1}$ arising from the oleic acid surfactants bound to the particle surface. The bands at 1545 $cm^{-1}$ and 1415 $cm^{-1}$ may be assigned to the antisymmetric and symmetric vibration modes of the carboxylate groups, indicating the adsorption of oleic acid onto the particle surface.

After the ligand exchange with PAA, a new band corresponding to the stretching mode of —COOH groups appeared at 1720 $cm^{-1}$. In addition, the bands at 2922 $cm^{-1}$ and 2853 $cm^{-1}$, associated with the asymmetrical stretching mode of —CH2 groups, nearly disappeared after ligand exchange. These observations strongly suggest that PAA chains successfully attached onto the particle surface in place of oleic acid surfactants.

Figure 7:
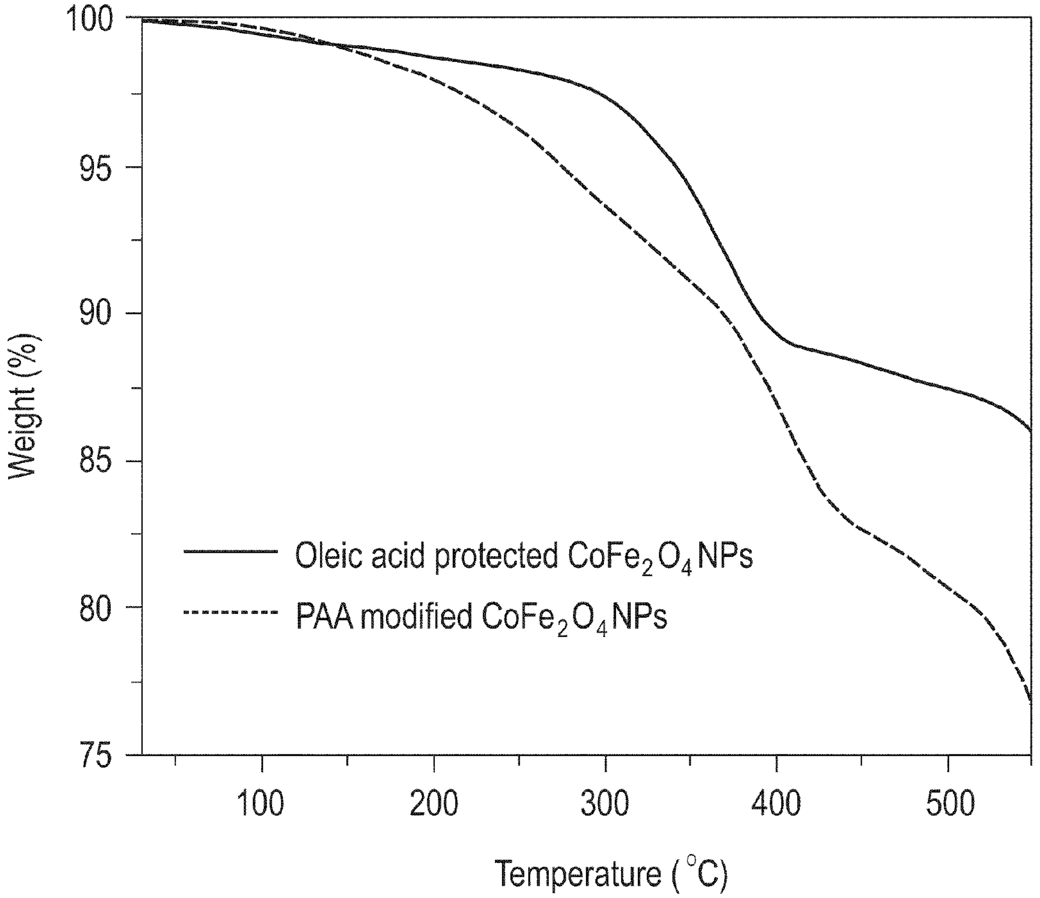
FIG. 7 shows a TGA (thermogravimetric analysis) thermogram of $CoFe_2O_4$ nanoparticles before and after PAA modification.

TGA measurements were conducted to quantitatively determine the PAA density adsorbed onto the particle surface. FIG. 7 shows a comparative TGA thermograph of the unmodified and PAA-modified $CoFe_2O_4$ nanoparticles. As shown therein, the unmodified $CoFe_2O_4$ nanoparticles showed a strong primary mass loss at ~280° C. followed by a second transition for mass loss at 500° C. The 13% total weight loss, which spans from 200° C. to 550° C., is attributed to the desorption of oleic acid, and is in agreement with the values reported in the literature. The TGA of the PAA-modified nanoparticles showed a mass loss of 25% in the same temperature range, which is ascribed to the decomposition of PAA. With an average particle size of 18 nm and a cobalt ferrite density of 5.15 g/$cm^3$, the number of PAA chains attached to the surface of each $CoFe_2O_4$ nanoparticles is estimated to be around 1750. TEM images further confirm that the core of the magnetic nanoparticles does not change after PAA ligand exchange (FIG. 2).

EXAMPLE 3

Silica Coating of PAA-Modified $CoFe_2O_4$

A 1.5 mL aqueous solution of the PAA-modified $CoFe_2O_4$ nanoparticles from Example 2 was diluted with 10 mL of ethanol and 400 μL ammonium hydroxide (30 wt %) with vigorous mechanical stirring. A 200 μL TEOS ethanol solution (10 mM) was added to the mixture every 2 h until the total amount of TEOS solution reached 1 mL. After obtaining the desired size, the silica-coated $CoFe_2O_4$ nanoparticles were collected by magnetic separation, washed with ethanol three times, and dispersed in ethanol for further characterization.

EXAMPLE 4

Synthesis of Amine-Functionalized Silica-Coated $CoFe_2O_4$ 10 mg of the silica-coated $CoFe_2O_4$ nanoparticles from Example 3 were dispersed in 8 mL of ethanol. Under vigorous stirring, a 500 μL ammonia (30 wt %) solution was added to the dispersion, followed by the addition of 100 μL 3-aminopropyltrimethoxylsilane (APTMS). The mixture was stirred at room temperature overnight. To enhance the covalent bonding of APTMS groups onto the particle surface, the mixture was gently refluxed for two hours. The reaction mixture was then centrifuged at 10,000 rpm for 20 min and the APTMS-coated $CoFe_2O_4$ nanoparticles were redispersed in ethanol for further washing. After three rounds of centrifugation and redispersion, pure APTMS functionalized $CoFe_2O_4$ nanoparticles were redispersed into ethanol or THF for further use.

EXAMPLE 5

Peg Functionalization of the Amine Functionalized Silica-Coated $CoFe_2O_4$ Nanoparticles 150 mg of poly(ethylene glycol)methylether acrylate (Mn=454) were dissolved in 5 mL of ethanol and added to a 3 mL ethanolic solution of the amine functionalized silica-coated $CoFe_2O_4$ nanoparticles of Example 4. The mixture was stirred at room temperature overnight. The reaction mixture was purified by centrifugation and washed with ethanol for 3 cycles. The final product was dispersed into water for further characterization.

We claim:

1. A method comprising:

(a) treating magnetic nanoparticles with a polyacid polymer to form polymer-coated magnetic nanoparticles and ionizing the polymer-coated magnetic nanoparticles with a base, and (b) reacting the polymer-coated magnetic nanoparticles with a silica precursor to form silica-coated magnetic nanoparticles, wherein magnetically induced aggregation of the magnetic nanoparticles of step (a) is completely inhibited by the silica-coating of step (b), wherein the magnetic nanoparticles are selected from the group consisting of ferrimagnetic nanoparticles and ferromagnetic nanoparticles.

2. The method of claim 1, wherein the magnetic nanoparticles are selected from the group consisting of ferrimagnetic nanoparticles and ferromagnetic nanoparticles.

3. The method of claim 2, wherein the nanoparticles comprise cobalt ferrite ($CoFe_2O_4$).

4. The method of claim 1, wherein the polyacid polymer is selected from the group consisting of poly(acrylic acid) (PAA), poly(methacrylic acid), poly(vinylsulfonic acid), poly(vinylphosphonic acid), and copolymers thereof.

5. The method of claim 4, wherein the polyacid polymer is PAA.

6. The method of claim 1, wherein the silica precursor is selected from the group consisting of tetraalkylorthosilicates ($Si(OR_1)_4$) and trialkoxyalkylsilanes ($R_2Si(OR_3)_3$), wherein each of R1, R2, and R3 is hydrogen, a monovalent hydrocarbon radical comprising 1 to 30 carbons, or an aminoalkyl group comprising 1 to 5 carbons.

7. The method of claim 6, wherein the silica precursor is selected from the group consisting of tetraethylorthosilicate (TEOS), tetramethylorthosilicate (TMOS), tetrapropylorthosilicate, methyltrimethoxysilane, and methyltriethoxysilane.

8. The method of claim 7, wherein the silica precursor is TEOS.

9. The method of claim 1, further comprising:

(c) reacting the silica-coated magnetic nanoparticles with a reactive silane to enable surface modification of the silica-coated magnetic nanoparticles with other organic functional groups.

10. The method of claim 9, wherein the silica-coated magnetic nanoparticles are amine functionalized with reactive silane aminopropyltrimethoxysilane (APTMS).

11. The method of claim 10, wherein the amine-functionalized silica-coated magnetic nanoparticles are further reacted with activated carboxylic acids to form amide bonds.

12. The method of claim 10, wherein the amine-functionalized silica-coated magnetic nanoparticles are further reacted with acrylates to form secondary and tertiary amines.

13. The method of claim 10, wherein the amine-functionalized silica-coated magnetic nanoparticles are further reacted with poly(ethylene glycol) acrylate to form poly(ethylene glycol) functionalized silica-coated magnetic nanoparticles.

14. The method of claim 1, wherein the magnetic nanoparticles of step (a) have a diameter of 1 to 100 nm.

15. The method of claim 1, wherein the magnetic nanoparticles of step (a) and the silica-coated magnetic particles of step (b) have the same core diameter.

16. The method of claim 1, wherein the silica-coated magnetic nanoparticles of step (b) have a silica shell thickness of 1 to 100 nm.

17. A method comprising:

(a) treating ferrimagnetic and/or ferromagnetic nanoparticles with poly(acrylic acid) (PAA) to form PAA-modified magnetic nanoparticles and ionizing the PAA-modified magnetic nanoparticles with a base; and (b) reacting the PAA-modified nanoparticles with tetramethylorthosilicate (TEOS) to form silica-coated magnetic nanoparticles, wherein magnetically induced aggregation of the magnetic nanoparticles of step (a) is completely inhibited by the silica-coating of step (b).

18. The method of claim 17, further comprising: (c) reacting the silica-coated magnetic nanoparticles with a reactive silane to enable surface modification of the silica-coated magnetic nanoparticles with other organic functional groups.

19. The method of claim 18, wherein silica-coated magnetic nanoparticles are amine functionalized with the reactive silane aminopropyltrimethoxysilane (APTMS).

20. The method of claim 19, wherein the amine-functionalized silica-coated magnetic nanoparticles are further reacted with activated carboxylic acids to form amide bonds.

21. The method of claim 19, wherein the amine-functionalized silica-coated magnetic nanoparticles are further reacted with acrylates to form secondary and tertiary amines.

22. The method of claim 19, wherein the amine functionalized silica-coated magnetic nanoparticles are further reacted with poly(ethylene glycol) acrylate to form poly(ethylene glycol) functionalized silica-coated magnetic nanoparticles.

23. The method of claim 17, wherein the magnetic nanoparticles of step (a) have a diameter of 1 to 100 nm.

24. The method of claim 17, wherein the magnetic nanoparticles of step (a) and the silica-coated magnetic particles of step (b) have the same core diameter.

25. The method of claim 17, wherein the silica-coated magnetic nanoparticles of step (b) have a silica shell thickness of 1 to 100 nm.

* * * * *